(12) United States Patent
Taimela et al.

(10) Patent No.: US 7,649,758 B2
(45) Date of Patent: Jan. 19, 2010

(54) POWER SUPPLY APPARATUS, METHODS AND COMPUTER PROGRAM PRODUCTS USING D-Q DOMAIN BASED SYNCHRONIZATION TECHNIQUES

(75) Inventors: Pasi S. Taimela, Raleigh, NC (US);
Kevin L. Van Eyll, Angier, NC (US);
Kevin Lee, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 428 days.

(21) Appl. No.: 11/565,119

(22) Filed: Nov. 30, 2006

(65) Prior Publication Data
US 2008/0130332 A1 Jun. 5, 2008

(51) Int. Cl.
*H02M 3/24* (2006.01)
*H02M 1/12* (2006.01)
(52) U.S. Cl. .............................. 363/98; 363/132; 363/40
(58) Field of Classification Search .................. 363/40, 363/41, 98, 131, 132, 65–71; 307/64, 82; 323/237, 244; 318/700, 705
See application file for complete search history.

(56) References Cited

U.S. PATENT DOCUMENTS 5,436,512 A * 7/1995 Inam et al. ..................... 363/41
5,745,356 A 4/1998 Tassitino, Jr. et al.
6,201,720 B1 * 3/2001 Tracy et al. .................... 363/95
6,549,440 B2 4/2003 Tassitino, Jr. et al.
6,650,081 B2 * 11/2003 Iwaji et al. ................... 318/700

OTHER PUBLICATIONS

Arruda et al., "PLL Structures for Utility Connected Systems," Industry Applications Conference, 2001, Thirty-Sixth IAS Annual Meeting, Publication Date: Sep. 30-Oct. 4, 2001, vol. 4, pp. 2655-2660 (pp. 1-6).
Phipps et al., "Three-Phase Phase-Locked Loop Control of a New Generation Power Converter," ICIEA Conference, Singapore, May 25, 2006, 6 pages.

* cited by examiner

*Primary Examiner*—Jessica Han
(74) *Attorney, Agent, or Firm*—Myers Bigel Sibley & Sajovec, P.A.

(57) ABSTRACT

A value of an AC reference waveform is obtained and converted to a d-q reference frame value. A phase estimate is generated responsive to the d-q reference frame value. An AC output of the power supply apparatus is controlled responsive to an output current of the power supply apparatus and the phase estimate. For example, an output current value may be obtained and converted to a d-q reference frame current value responsive to the phase estimate, and the AC output may be controlled responsive to the d-q reference frame current value.

27 Claims, 5 Drawing Sheets

POWER SUPPLY APPARATUS, METHODS AND COMPUTER PROGRAM PRODUCTS USING D-Q DOMAIN BASED SYNCHRONIZATION TECHNIQUES

BACKGROUND OF THE INVENTION

The invention relates to power supplies, and more particularly, to AC power supply apparatus and methods and computer program products for operating the same.

In some power supply applications, such as in uninterruptible power supply (UPS) applications, it may be desirable to synchronize the output of a UPS to an AC waveform reference. For example, in some UPS applications, it may be desirable to synchronize an output inverter of a UPS to a bypass source, such as a utility source or generator, or to a reference AC waveform signal. U.S. Pat. No. 5,745,355 to Tassitino, Jr. et al. and U.S. Pat. No. 6,549,440 to Tassitino, Jr. et al. describe various techniques for achieving such synchronization in on-line UPS configurations.

SUMMARY OF THE INVENTION

Some embodiments of the present invention provide methods of operating a power supply apparatus, such as an inverter of a UPS. A value of an AC reference waveform, such as an AC input voltage from a utility or other AC source, is obtained and converted to a d-q reference frame value. A phase estimate is generated responsive to the d-q reference frame value. An AC output of the power supply apparatus is controlled responsive to an output current of the power supply apparatus and the phase estimate. For example, an output current value may be obtained and converted to a d-q reference frame current value responsive to the phase estimate, and the AC output may be controlled responsive to the d-q reference frame current value.

In further embodiments, generating a phase estimate responsive to the d-q reference frame value may include generating an angle estimate responsive to the d-q reference frame value and converting the output current value to a d-q reference frame current value responsive to the phase estimate may include converting the output current value to the d-q reference frame current value responsive to the angle estimate. Controlling the AC output responsive to the d-q reference frame current value may include generating an AC output voltage waveform reference signal responsive to the d-q reference frame current value, detecting an AC output voltage of the UPS, comparing the AC output voltage waveform reference signal to the detected AC output voltage, and controlling the AC output current responsive to the comparison of the AC output voltage waveform reference signal and the detected AC output voltage.

In some embodiments, obtaining a value of an AC reference waveform may include obtaining a first value of the AC reference waveform. Converting the value to a d-q reference frame value may include converting the first value of the AC reference waveform to a first d-q component value. Generating a phase estimate responsive to the d-q reference frame value may include generating a first phase estimate responsive to a comparison of the first d-q component value to a reference d-q component value. Obtaining a value of an AC reference waveform may further include obtaining a second value of the AC reference waveform. Converting the value to a d-q reference frame value may further include converting the second value of the AC reference waveform to a second d-q component value according to the first phase estimate. Generating a phase estimate responsive to the d-q reference frame value may further include generating a second phase estimate responsive to a comparison of the second d-q component value to the reference d-q component value. The first and second d-q component values may include respective first and second quadrature component values and the reference d-q component value may include a reference quadrature component value.

In further embodiments, controlling an AC output of the power supply apparatus responsive to an output current of the power supply apparatus and the phase estimate includes controlling an output inverter of a UPS. The AC reference waveform may include an AC voltage of an AC source. A DC voltage may be generated from the AC source using a passive rectifier. Controlling an AC output of the power supply apparatus responsive to an output current of the power supply apparatus and the phase estimate may include generating the AC output from the DC voltage responsive to the output current of the power supply apparatus and the phase estimate.

In further embodiments of the present invention, a power supply apparatus includes a phase estimator circuit configured to convert a value of an AC reference waveform to a d-q reference frame value and to generate a phase estimate responsive to the d-q reference frame value and an AC voltage generator circuit configured to generate an AC output at an output thereof responsive to an output current and the phase estimate. The AC voltage generator circuit may be configured to obtain an output current value, to convert the output current value to a d-q reference frame current value responsive to the phase estimate and to generate the AC output responsive to the d-q reference frame current value.

According to further embodiments of the present invention, a UPS includes an inverter having an output configured to be coupled to a load, and a control circuit configured to convert a value of an AC reference waveform to a d-q reference frame value, to generate a phase estimate responsive to the d-q reference frame value and to cause the inverter to generate an AC output at the output of the inverter responsive to an output current and the phase estimate. The control circuit may be configured to obtain an output current value, to convert the output current value to a d-q reference frame current value responsive to the phase estimate and to cause the inverter to generate the AC output responsive to the d-q reference frame current value.

DETAILED DESCRIPTION OF EXEMPLARY EMBODIMENTS

Figure 1:
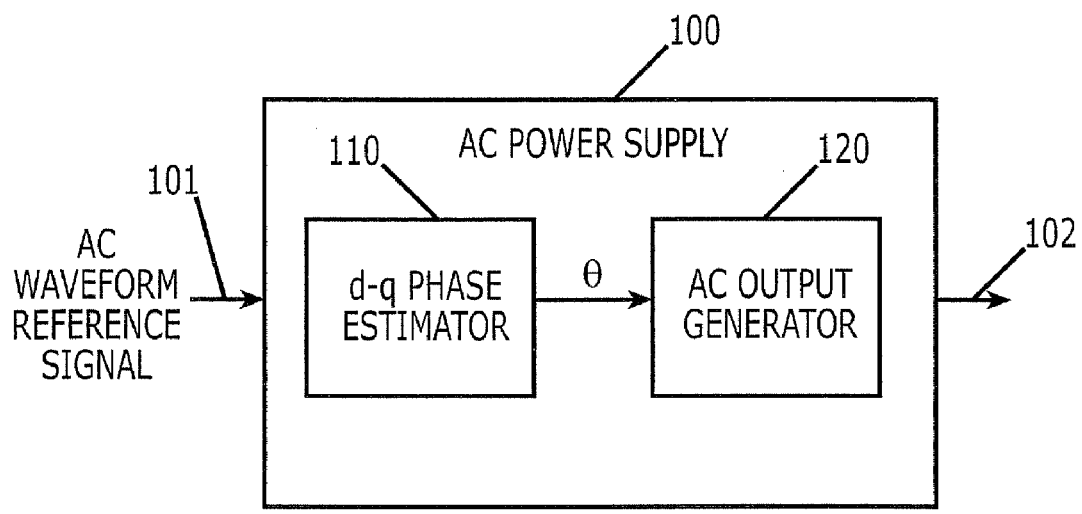
FIG. 1 is a schematic diagram illustrating an AC power supply apparatus and operations thereof according to some embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as apparatus, methods and computer program products. Embodiments of the invention may include hardware and/or software. Furthermore, the invention may take the form of a computer program product on a computer-usable storage medium having computer-usable program code embodied in the medium. Any suitable computer readable medium may be utilized including a hard disk, CD-ROM, optical storage device, magnetic storage device or a transmission medium.

Embodiments of the invention include circuitry configured to provide functions described herein. It will be appreciated that such circuitry may include analog circuits, digital circuits, and combinations of analog and digital circuits.

The invention is described below with reference to block diagrams and/or operational illustrations of methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the invention arise from a realization that improved synchronization of a power supply apparatus, such as the output inverter of a UPS, to an AC reference waveform, such as a waveform of a utility, generator or other AC source, may be achieved by utilizing d-q domain techniques to generate a waveform reference that is used for AC output control. Such techniques, in contrast to conventional zero-crossing techniques, may enable estimation of the timing of the AC waveform at a rate substantially greater than the fundamental frequency of the waveform. This may, for example, enable the AC output control circuitry to more closely track AC sources, such as generators, that may exhibit relatively high rates of frequency/phase variation. Such techniques also may be less susceptible to detection noise effects, such as those exhibited in some zero-crossing based techniques. In further embodiments of the present invention, such control architectures may be advantageous employed in paralleled online UPS applications, and may provide desirable load sharing and transient performance even when the AC output waveform is distorted.

FIG. 1 illustrates a power supply apparatus 100 and operations thereof according to some embodiments of the present invention. The power supply apparatus, which may be, for example, a UPS, includes a d-q phase estimator circuit 110, which is configured to estimate a phase angle θ for an AC reference waveform 101. The phase angle θ is provided to an AC output generator circuit 120, which produces an AC output 102 responsive to the determined phase angle θ. For example, in some embodiments, such as UPS applications, the AC reference waveform 101 may be a voltage waveform of an AC source to which the UPS desires to synchronize for purposes, for example, of load transfer, interactive operation, or the like.

Figure 2:
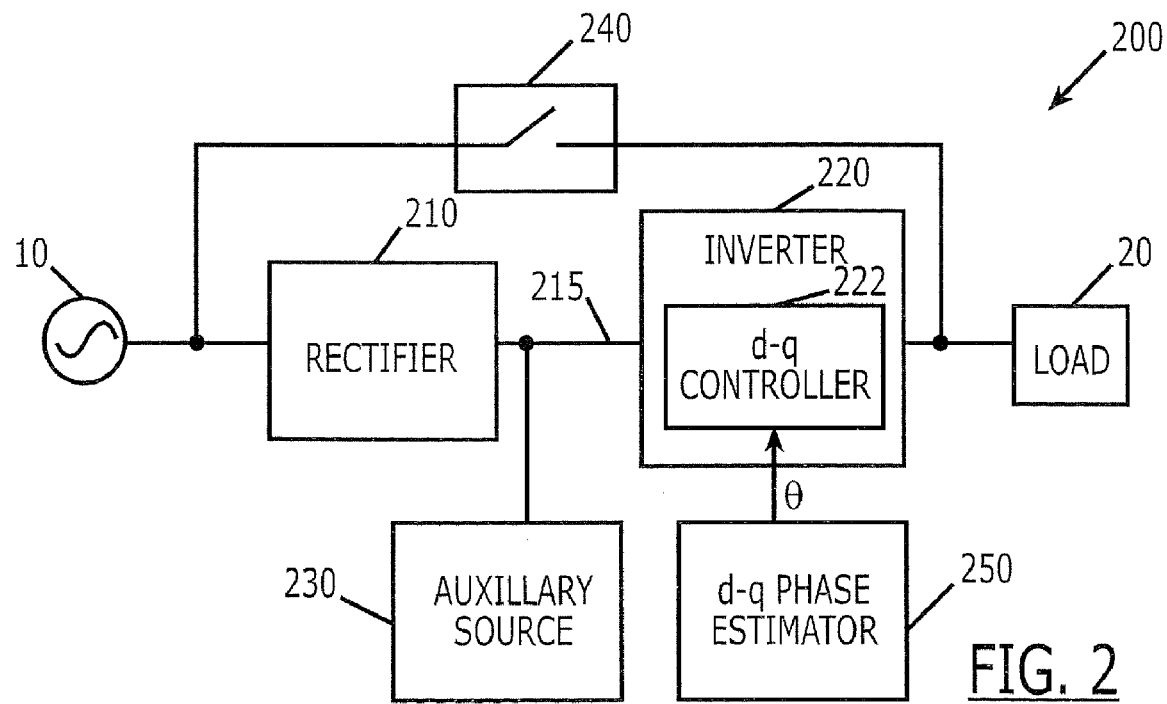
FIG. 2 is a schematic diagram illustrating a UPS and operations thereof according to further embodiments of the invention.

FIG. 2 illustrates an example of a UPS application according to some embodiments of the present invention. A UPS 200 includes a rectifier 210 that is configured to receive power from an AC source 10, such as a utility line or generator. The rectifier produces a DC voltage on a DC bus 215 from the AC voltage produced by the AC source 10. The DC bus 215 may also be powered by an auxiliary source 230, e.g., a battery, fuel cell or other power source. An inverter 220 is coupled to the DC bus 215, and generates an AC output to power a load 20. A bypass circuit 240 is configured to bypass the rectifier 210 and inverter 220 to provide AC power to the load 20 directly from the AC source 10 in certain modes of operation. For example, in some embodiments of the present invention, the bypass path may be used when the rectifier 210 and/or inverter 220 fails and/or may be used to provide a "high efficiency" mode of operation wherein the load is powered by the AC source 10 while the rectifier 210 and/or inverter 220 are used to provide power conditioning, e.g., power factor control, harmonic suppression and the like.

In such operations, it may be desirable to synchronize the operation of the inverter 220 with the AC source 10. For example, when operating on-line, i.e., with the rectifier 210 and inverter 210 supplying power to the load, it may be desirable to achieve synchronism of the inverter 220 with the AC source 10 to allow a relatively smooth waveform transition when changing to bypass operation. Similarly, when operating on bypass, it may be desirable to maintain synchronization of the waveform reference used for the inverter 220 with the AC source 10 such that, should the AC source 10 fail, a relatively smooth waveform transition may occur when changing to on-line operation.

According to some embodiments of the present invention illustrated in FIG. 2, the UPS 200 may include a d-q domain phase estimator 250 that generates phase estimates for the waveform of the AC source 10. The inverter 220 may include a d-q domain controller 222 that controls the inverter 220 responsive to the phase estimates. More particularly, the phase estimator 250 may generate phase estimates at a rate substantially higher than a fundamental frequency (e.g., 60 Hz) of the AC source waveform. This may enable the inverter 220 to provide relatively high performance in responding to variation in the AC source waveform. Such techniques may also provide more accurate control of the inverter 220 when the output thereof is subject to distortion, such as when the DC voltage on the DC bus 215 is low and causes the inverter 220 to clip the waveform of the AC output. Such improved control may, for example, facilitate improved load sharing when the UPS 200 is paralleled with a plurality of similar UPSs.

Figure 3:
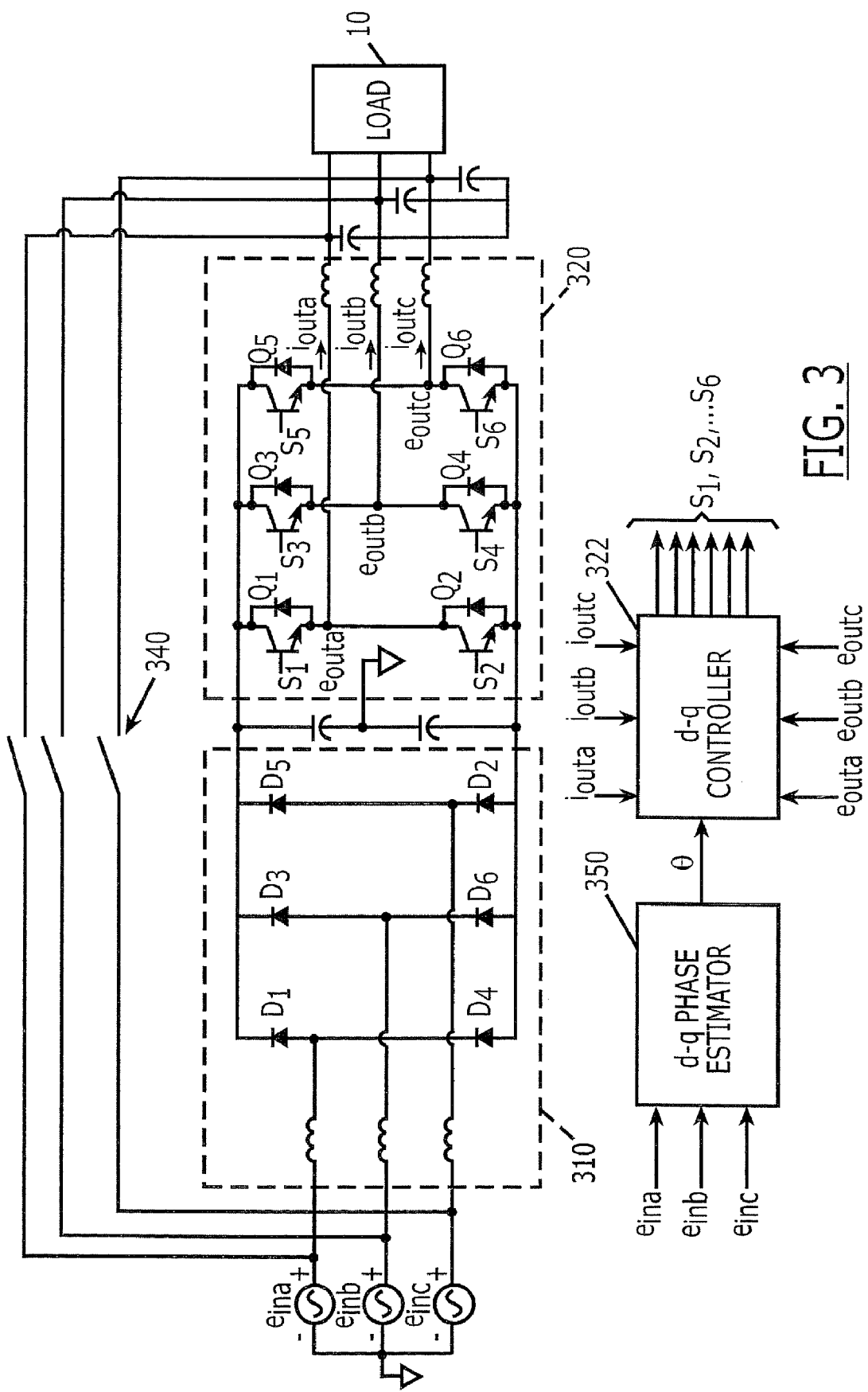
FIG. 3 is a schematic diagram illustrating an inverter circuit that may be used in some embodiments of the present invention.

FIG. 3 illustrates in greater detail how such d-q based synchronization and control may be implemented in a typical UPS according to further embodiments of the present invention. Portions of a UPS include an input rectifier circuit 310, an inverter 320 coupled thereto, and a bypass circuit 340 that is configured to bypass the rectifier 310 and the inverter 320. Three-phase voltages $e_{ina}$, $e_{inb}$, $e_{inc}$ are applied to the rectifier 310, which responsively produces a DC input for the inverter 320. As shown, a d-q phase estimator 350 estimates a desired angle θ for the inverter 320 responsive to the three-phase voltages $e_{ina}$, $e_{inb}$, $e_{inc}$. In particular, responsive to the determined angle θ, inverter output voltages $e_{outa}$, $e_{outb}$, $e_{outc}$ and output currents $e_{outa}$, $e_{outb}$, $e_{outc}$, a d-q controller 322 generates drive signals S1, S2, . . . , S6 that drive bridge transistors Q1, Q2, . . . , Q6 of the inverter 320.

Figure 4:
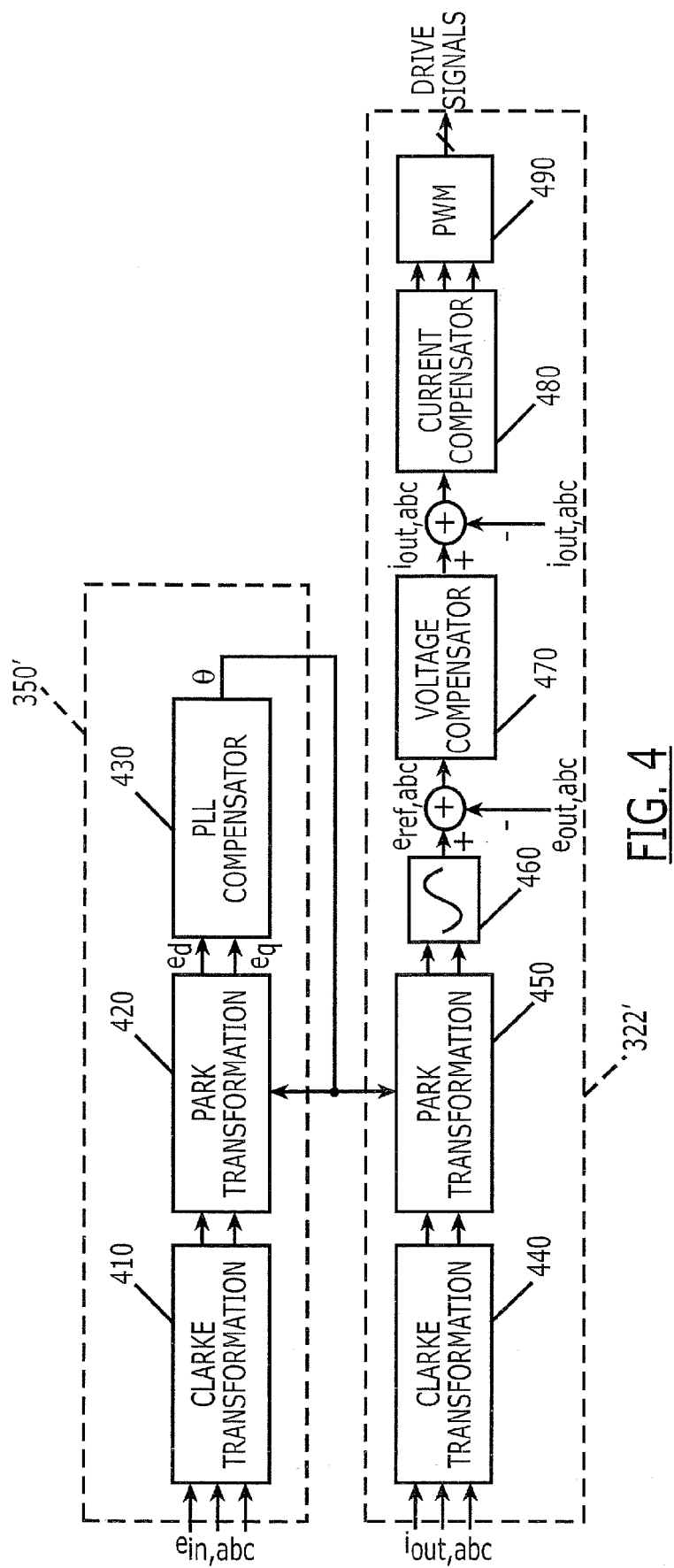
FIG. 4 is a schematic diagram illustrating a d-q domain controller for an inverter circuit, such as the inverter circuit of FIG. 3, according to further embodiments of the invention.

Referring to FIG. 4, a d-q domain angle estimator 350' may include a Clarke transformation unit 410 that converts sample values $e_{in,abc}$, samples of the AC source voltages $e_{ina}$, $e_{inb}$, $e_{inc}$ FIG. 3. to voltage values $e_\alpha$, $e_\beta$. The converted voltage values $e_\alpha$, $e_\beta$ are provided to a d-q domain phase locked loop (PLL) that generates angle estimates θ. In particular, the PLL includes a Park transformation unit 420 that produces d and q component values $e_d$, $e_q$ from the values $e_\alpha$, $e_\beta$, responsive to the angle estimates θ, and provides the d-q domain values $e_d$, $e_q$ to a PLL compensator 430 that generates the angle estimates θ. It will be appreciated that the PLL compensator 430 may take a variety of different forms depending on the performance characteristics desired.

A d-q domain controller 322' includes a Clarke transformation unit 440 that, responsive to output current samples $i_{out,abc}$, produces converted current values $i_\alpha$, $i_\beta$. The angle estimates θ produced by the angle estimator 350' are provided to a Park transformation unit 450, which transforms the converted current values $i_\alpha$, $i_\beta$ to d-q domain values $i_d$, $i_q$. The d-q domain current values $i_d$, $i_q$ are fed to an AC output voltage waveform reference signal generator unit 460. The AC output voltage reference signal generator unit 460 responsively generates an AC output voltage reference signal $e_{ref,abc}$ that is used as a reference signal input for an output voltage control loop. In particular, the AC output voltage reference signal $e_{ref,abc}$ (e.g., reference sinusoidal signals for each phase) is compared with an output voltage signal $e_{out,abc}$ (e.g., sample signals corresponding to output phase voltages) to generate an error signal that is applied to a voltage compensator unit 470. The voltage compensator circuit 470 responsively generates an output current reference signal $i_{out,abc}$, which is compared with the sensed output current $i_{ref,abc}$ to provide a current error signal that is applied to a current compensator 480. The current compensator 480 responsively drives a PWM unit 490 that generates drive signals for the inverter bridge transistors. It will be understood that, in further embodiments of the present invention, d-q based techniques for generating phase information along the lines discussed above may be used in systems without an inner current loop as shown in FIG. 4 and in applications (e.g., open loop) with neither voltage nor current loops.

It will be appreciated that the phase estimator 350' and controller 322' may be implemented, wholly or in part, using a general purpose computing device, such as a microcontroller, microprocessor, digital signal processor (DSP) or the like. Embodiments of the present invention also include computer program products including computer program code configured to implement the operations of FIG. 4 in a computing device. It will be further appreciated that all or some of the functions illustrated in FIG. 4 may generally implemented using any of a variety of different analog and/or digital circuitry.

Figure 5:
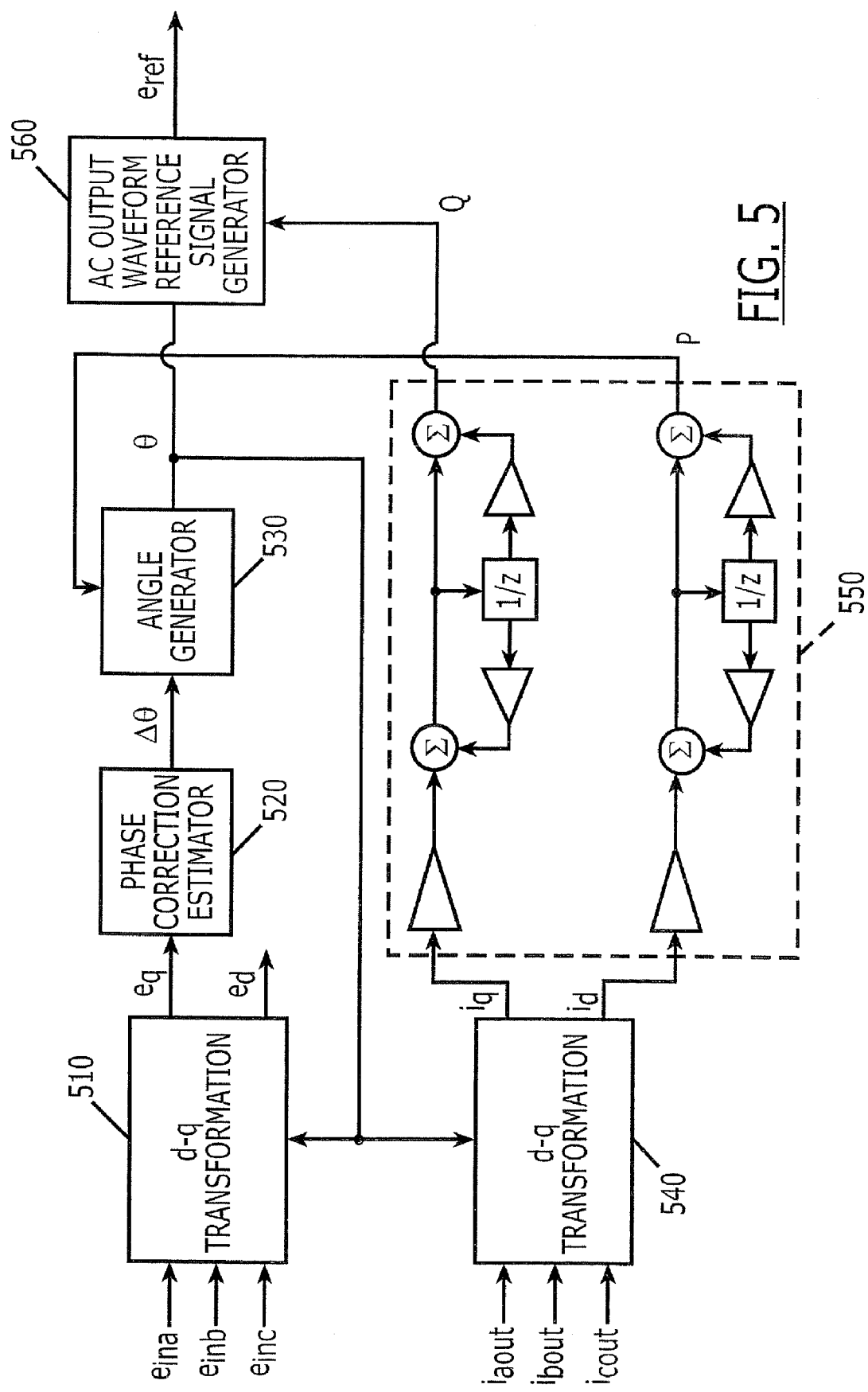
FIG. 5 is a schematic diagram illustrating an exemplary implementation of a d-q controller according to some embodiments of the invention.

FIG. 5 illustrates an exemplary implementation of the functions shown in FIG. 4 according to further embodiments of the present invention. A PLL includes a first d-q transformation unit 510, i.e., a unit that provides Clarke and Park transformations, produces q (quadrature) and d (direct) component values $e_q$, $e_d$ from AC voltage samples $e_{ina}$, $e_{inb}$, $e_{inc}$. The q component values $e_q$ are provided to a phase correction estimator unit 520, which responsively generates phase correction values Δθ. The phase correction values Δθ are provided to an angle generator 530, which generates phase-corrected angle values θ responsive to the correction value Δθ and real power correction values P generated by a proportional-derivative (PD) compensator 550. In particular, the phase correction values Δθ represent a correction to bring the phase-corrected angle values θ, which may be used as an angular reference for driving an inverter, in sync with the AC waveform from which the AC voltage samples $e_{ina}$, $e_{inb}$, $e_{inc}$ are generated. The real power correction values P may act to modify (shift) the angle values θ to provide a desired power transfer by the inverter, e.g., for purposes of load sharing along lines similar to techniques described in the aforementioned U.S. Pat. Nos. 5,745,356 and 6,549,440.

The phase-corrected angle values θ are provided to an AC output waveform reference signal generator unit 560, which generates an AC output voltage reference signal $e_{ref}$ (e.g., a series of values representing a desired output voltage waveform) responsive to the phase-corrected inverter angle values θ and reactive power correction values Q generated by the PD compensator 550. The reactive power correction values Q may be used to modify the amplitude of the AC output voltage reference signal $e_{ref}$ for power flow control purposes (e.g., power sharing), along lines similar to those described in the above-referenced U.S. Pat. Nos. 5,745,356 and 6,549,440. The PD compensator 550 generates the real and reactive power correction values P, Q responsive to d and q current components $i_q$, $d_d$ generated from output current samples $i_{aout}$, $i_{bout}$, $i_{cout}$ by a second d-q transformation unit 540 responsive to the phase-corrected inverter angle values θ. The AC output voltage reference signal $e_{ref}$ may be used for AC output control of an inverter along lines discussed above with reference to FIG. 4. When the AC source from which the AC voltage samples $e_{ina}$, $e_{inb}$, $e_{inc}$ are generated fails, the PLL can be opened and the angle generator 530 may continue to generate angle values θ to support generation of the AC output voltage reference signal $e_{ref}$, e.g., by maintaining the phase and frequency at which the angle values θ are being generated at the time the AC source fails.

It will be appreciated that the circuitry shown in FIG. 5 may be implemented, wholly or in part, using a general purpose computing device, such as a microcontroller, microprocessor, digital signal processor (DSP) or the like. Embodiments of the present invention also include computer program products including computer program code configured to implement the operations of FIG. 5 in a computing device. It will be further appreciated that all or some of the functions illustrated in FIG. 5 may generally implemented using any of a variety of different analog and/or digital circuitry.

Figure 6:
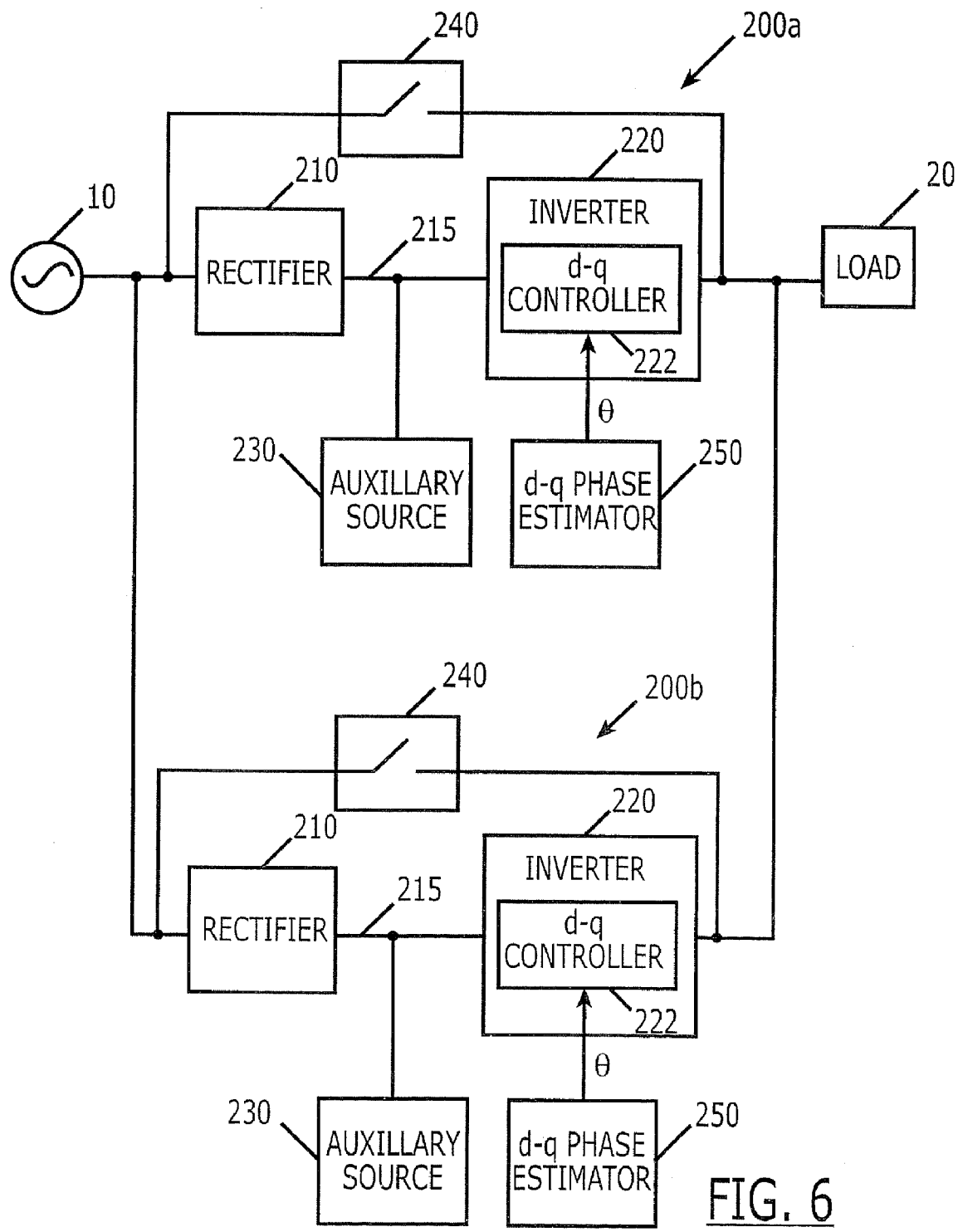
FIG. 6 illustrates a parallel application of UPSs according to some embodiments of the present invention.

According to further embodiments of the present invention, phase estimation and control along the lines described above may be provided in a UPS to provide advantageous performance in paralleled applications. FIG. 6 illustrates first and second UPSs 200a, 200b, which include components as described above with reference to FIG. 2. Inputs of the UPSs 200a, 200b are connected in parallel to a common AC source 10, while outputs of the UPSs 200a, 200b are connected in parallel to a load 20. As noted above, in such paralleled applications, it is generally desirable that the paralleled UPSs provide a predetermined load sharing, for example, that the UPSs 200a, 200b provide substantially the same amount of power to the load 20. As further noted above, inverter control along lines discussed above with reference to FIGS. 2-5 may provide improved load sharing in such paralleled applications.

For example, such techniques may be particularly effective in paralleled applications in which the rectifiers 210 of the UPSs 200a, 200b are diode bridge rectifiers, e.g., rectifiers having the structure of the rectifier 310 of FIG. 3. The DC voltage produced by such a rectifier is typically constrained by the AC source 10, as the rectifier typically does not have the ability to boost the DC voltage. Under low input voltage conditions, the inverters 220 may produce an AC output waveform that is "clipped" or "flat-topped" due to low DC input voltage to the inverters 220. Some inverter output voltage control loops that derive information about the AC source using a conventional zero crossing PLL or other relatively low bandwidth techniques may have difficulty in achieving desirable load sharing among the UPSs under such distorted output waveform conditions. UPSs using inverter control techniques according to some embodiments of the present invention, however, may provide improved load sharing performance under such conditions. For example, using a control architecture as shown in FIG. 4, the sampling for computation of angle estimates θ and values of AC output voltage reference signal $e_{ref,abc}$ input into the output voltage control loop may occur at rates (e.g., 2.5 kHz or more) substantially greater than the fundamental frequency of the source AC voltage (e.g., 60 Hz), which can provide improved transient performance. As an added benefit, sampling and computations for phase determination and output control may be performed at a common rate, which may simplify controller design.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a power supply apparatus, the method comprising:
    obtaining a value of an AC reference waveform representing a voltage waveform of an AC source to which an AC output of the power supply apparatus is to be synchronized;
    converting the value to a d-q reference frame value;
    generating a phase estimate responsive to the d-q reference frame value; and
    controlling the AC output of the power supply apparatus responsive to an output current of the power supply apparatus and the phase estimate.

2. The method of claim 1, wherein controlling the AC output of the power supply apparatus responsive to an output current of the power supply apparatus and the phase estimate comprises:
    obtaining an output current value;
    converting the output current value to a d-q reference frame current value responsive to the phase estimate; and
    controlling the AC output responsive to the d-q reference frame current value.

3. The method of claim 2:
    wherein generating a phase estimate responsive to the d-q reference frame value comprises generating an angle estimate responsive to the d-q reference frame value; and
    wherein converting the output current value to a d-q reference frame current value responsive to the phase estimate comprises converting the output current value to the d-q reference frame current value responsive to the angle estimate.

4. The method of claim 2, wherein controlling the AC output responsive to the d-q reference frame current value comprises:
    generating an AC output voltage waveform reference signal responsive to the d-q reference frame current value;
    detecting an AC output voltage at the AC output;
    comparing the AC output voltage waveform reference signal to the detected AC output voltage; and
    controlling the AC output current responsive to the comparison of the AC output voltage waveform reference signal and the detected AC output voltage.

5. The method of claim 2:
    wherein obtaining a value of an AC reference waveform comprises obtaining a first value of the AC reference waveform;
    wherein converting the value to a d-q reference frame value comprises converting the first value of the AC reference waveform to a first d-q component value;
    wherein generating a phase estimate responsive to the d-q reference frame value comprises generating a first phase estimate responsive to a comparison of the first d-q component value to a reference d-q component value;
    wherein obtaining a value of an AC reference waveform further comprises obtaining a second value of the AC reference waveform;
    wherein converting the value to a d-q reference frame value further comprises converting the second value of the AC reference waveform to a second d-q component value according to the first phase estimate; and
    wherein generating a phase estimate responsive to the d-q reference frame value further comprises generating a second phase estimate responsive to a comparison of the second d-q component value to the reference d-q component value.

6. The method of claim 5, wherein the first and second d-q component values comprise respective first and second quadrature component values and wherein the reference d-q component value comprises a reference quadrature component value.

7. The method of claim 1, wherein controlling the AC output of the power supply apparatus responsive to an output current of the power supply apparatus and the phase estimate comprises controlling an output inverter of an uninterruptible power supply (UPS).

8. The method of claim 1, wherein the AC reference waveform comprises an AC voltage of an AC source, and further comprising generating a DC voltage from the AC source using a passive rectifier, and wherein controlling the AC output of the power supply apparatus responsive to an output current of the power supply apparatus and the phase estimate comprises generating the AC output from the DC voltage responsive to the output current of the power supply apparatus and the phase estimate.

9. The method of claim 1, wherein generating a phase estimate responsive to the d-q reference frame value comprises generating estimates of the phase of the AC reference waveform at a rate substantially greater than a fundamental frequency of the AC reference waveform.

10. A UPS configured to perform the method of claim 1.

11. A plurality of UPSs having their AC outputs connected in parallel to a load and configured to perform the method of claim 1.

12. A computer program product comprising computer program code embodied in a storage medium, the computer program code comprising program code configured to perform the method of claim 1.

13. A power supply apparatus, comprising:
a phase estimator circuit configured to convert a value of an AC reference waveform to a d-q reference frame value and to generate a phase estimate responsive to the d-q reference frame value, wherein the AC reference waveform represents a voltage waveform of an AC source to which an AC output of the power supply apparatus is to be synchronized; and
an AC voltage generator circuit configured to generate an AC output voltage at the AC output responsive to an output current and the phase estimate.

14. The apparatus of claim 13, wherein the AC voltage generator circuit is configured to obtain an output current value, to convert the output current value to a d-q reference frame current value responsive to the phase estimate and to generate the AC output voltage responsive to the d-q reference frame current value.

15. The apparatus of claim 14:
wherein the phase estimator circuit is configured to generate an angle estimate responsive to the d-q reference frame value; and
wherein the AC voltage generator circuit is configured to convert the output current value to the d-q reference frame current value responsive to the angle estimate.

16. The apparatus of claim 14, wherein the AC voltage generator circuit is configured to generate an AC output voltage waveform reference signal responsive to the d-q reference frame current value, to detect an AC output voltage at the AC output, to compare the AC output voltage waveform reference signal to the detected AC output voltage and to control the AC output current responsive to the comparison of the AC output voltage waveform reference signal and the detected AC output voltage.

17. The apparatus of claim 13, wherein the phase estimator circuit comprises a PLL configured to generate the estimate of the phase of the AC reference waveform responsive to the d-q reference frame value.

18. The apparatus of claim 17, wherein the d-q reference frame value comprises a quadrature component value.

19. The apparatus of claim 13, wherein the AC voltage generator circuit comprises an inverter.

20. The apparatus of claim 13, wherein the phase estimator circuit is configured to sequentially generate estimates of the phase of the AC reference waveform at a rate substantially greater than a fundamental frequency of the AC reference waveform.

21. A UPS, comprising:
an inverter having an AC output configured to be coupled to load; and
a control circuit configured to convert a value of an AC reference waveform to a d-q reference frame value, to generate a phase estimate responsive to the d-q reference frame value and to cause the inverter to generate an AC output voltage at the AC output responsive to an output current and the phase estimate. wherein the AC reference waveform represents a voltage waveform of an AC source to which the AC output voltage is to be synchronized.

22. The UPS of claim 21, wherein the controller circuit is configured to obtain an output current value, to convert the output current value to a d-q reference frame current value responsive to the phase estimate and to cause the inverter to generate the AC output voltage responsive to the d-q reference frame current value.

23. The UPS of claim 22, wherein the control circuit is configured to generate an angle estimate responsive to the d-q reference frame value and to convert the output current value to the d-q reference frame current value responsive to the angle estimate.

24. The UPS of claim 22, wherein the control circuit is configured to generate an AC output voltage waveform reference signal responsive to the d-q reference frame current value, to detect the generated AC output voltage, to compare the AC output voltage waveform reference signal to the detected AC output voltage and to control the output current responsive to the comparison of the AC output voltage waveform reference signal and the detected AC output voltage.

25. The UPS of claim 21, wherein the control circuit comprises a phase lock loop (PLL) configured to generate the estimate of the phase of the AC reference waveform responsive to the d-q reference frame value.

26. The UPS of claim 25, wherein the d-q reference frame value comprises a quadrature component value.

27. The UPS of claim 21, wherein the control circuit is configured to generate phase estimates for the AC reference waveform at a rate substantially greater than a fundamental frequency of the AC reference waveform.

* * * * *